Nov. 16, 1954

R. T. POUNDS 2,694,310

WEIGHT DETERMINING DEVICE

Filed March 3, 1948

INVENTOR
RICHARD T. POUNDS.

BY *Joseph Shea*

ATTORNEY

INVENTOR
RICHARD T. POUNDS.
BY Joseph Shea
ATTORNEY

Nov. 16, 1954  R. T. POUNDS  2,694,310
WEIGHT DETERMINING DEVICE
Filed March 3, 1948  5 Sheets-Sheet 4
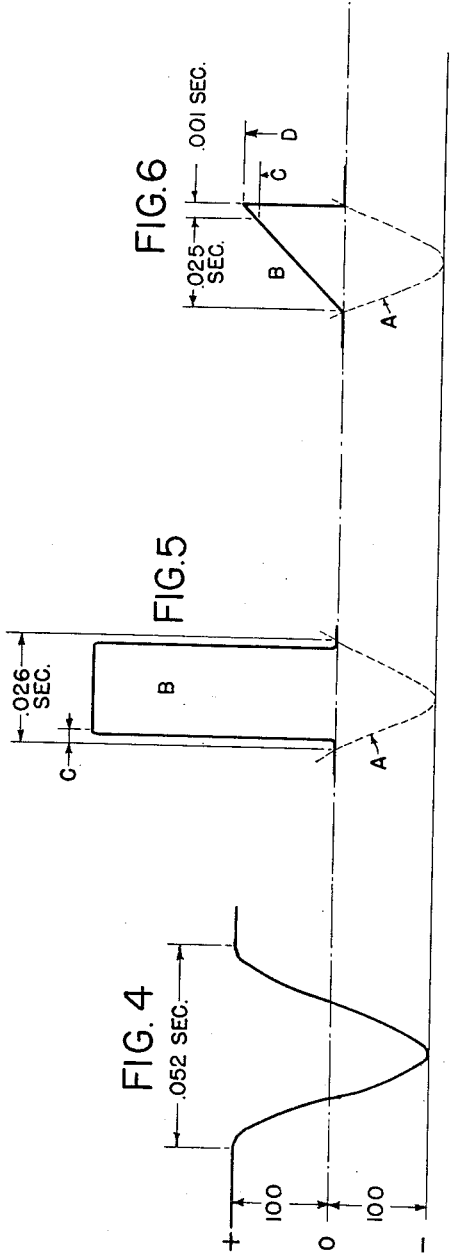
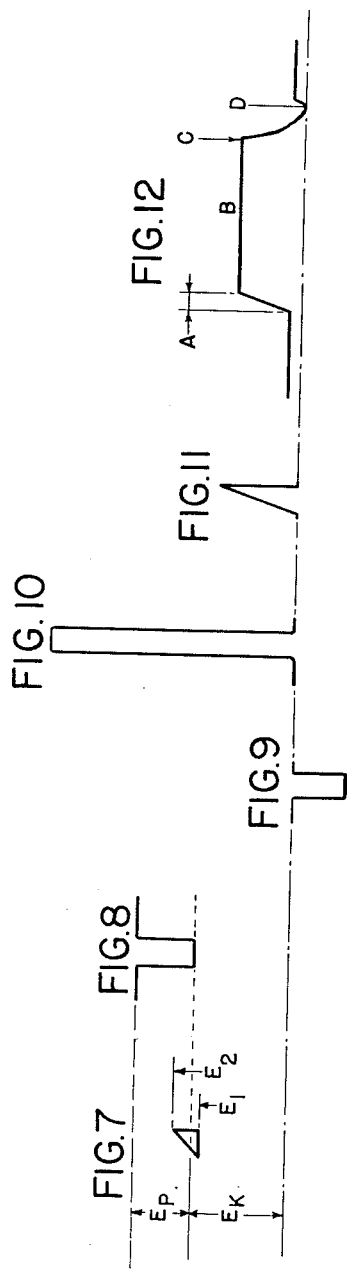
INVENTOR
RICHARD T. POUNDS.
BY Joseph Shea
ATTORNEY Nov. 16, 1954　　　R. T. POUNDS　　　2,694,310
WEIGHT DETERMINING DEVICE Filed March 3, 1948　　　　　　　　　　　5 Sheets-Sheet 5

INVENTOR
RICHARD T. POUNDS.
BY Joseph Shea
ATTORNEY

United States Patent Office 2,694,310
Patented Nov. 16, 1954

2,694,310

WEIGHT DETERMINING DEVICE

Richard T. Pounds, Westport, Conn., assignor to American Machine & Foundry Company, a corporation of New Jersey Application March 3, 1948, Serial No. 12,705

19 Claims. (Cl. 73—67)

This invention relates to weight determining devices, more particularly to devices which are sensitive and fast enough to weigh material or objects of relatively small weight, such as cigarettes, at relatively high speeds, preferably on the order of several hundred weighings per minute.

Thus one of the main objects of the invention is to weigh the objects in a very short interval of time.

A further object of the invention is to determine the weight of the object to be weighed by measuring the variations in the time required by a vibratory structure supporting said object, to traverse a predetermined portion of one vibration cycle. For this purpose the object to be weighed may be supported on a structure adapted to vibrate when it is deflected from a neutral position. The vibration of this structure serves to control the flow of current in an electrical circuit during a predetermined portion of one vibration cycle of the structure. Variations in the weight of the object supported on said structure will be reflected in differences in the electrical current flowing in said circuit and thereby permit determination of the weight of the object to be weighed.

A further object is to make this weight determining device insensitive to extraneous vibration. For this purpose the time required by the vibratory structure or sampling member supporting said object, to complete said predetermined portion of a vibration cycle, is compared with the time required by a vibratory structure or standard member having a vibration frequency approximately equal to that of the sampling member when the latter supports an object of the required weight. Accordingly, if the sampling and standard members are vibrated at the same time while the object to be weighed is supported on the standard member, variations in the vibration frequency of said sampling member will correspond to variations in the weight of said object despite variations in extraneous vibration. Therefore, variations in these two time intervals can be determined to obtain the weight of the object being weighed.

Other objects and features of the invention will appear as the description of the particular physical embodiment selected to illustrate the invention progresses.

In the accompanying drawings which form a part of this specification, like characters of reference have been applied to corresponding parts throughout the several views which make up the drawings;

Figs. 4–12 show the wave forms which may be observed by connecting an oscilloscope to the pin-jacks J–1 to J–7 inclusive, shown in Fig. 3.

Figure 1:
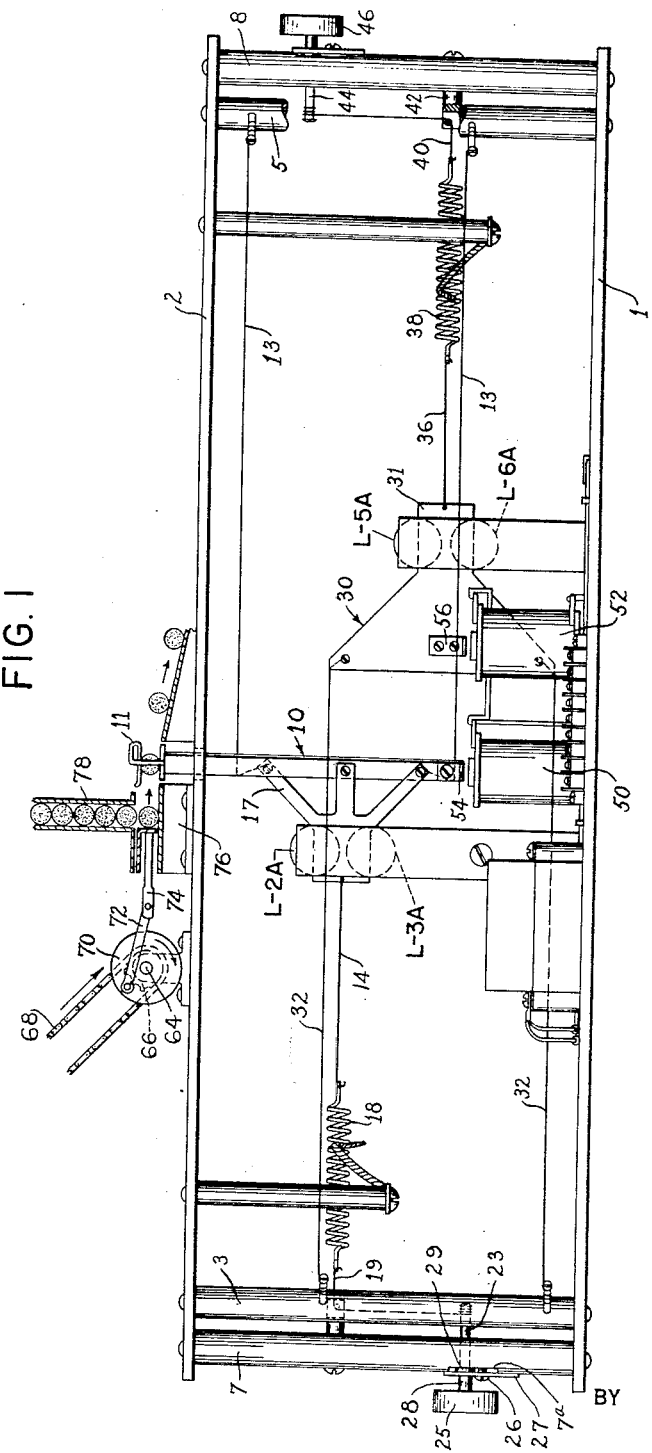
Fig. 1 is a side elevation of a weighing apparatus embodying my invention.
Figure 2:
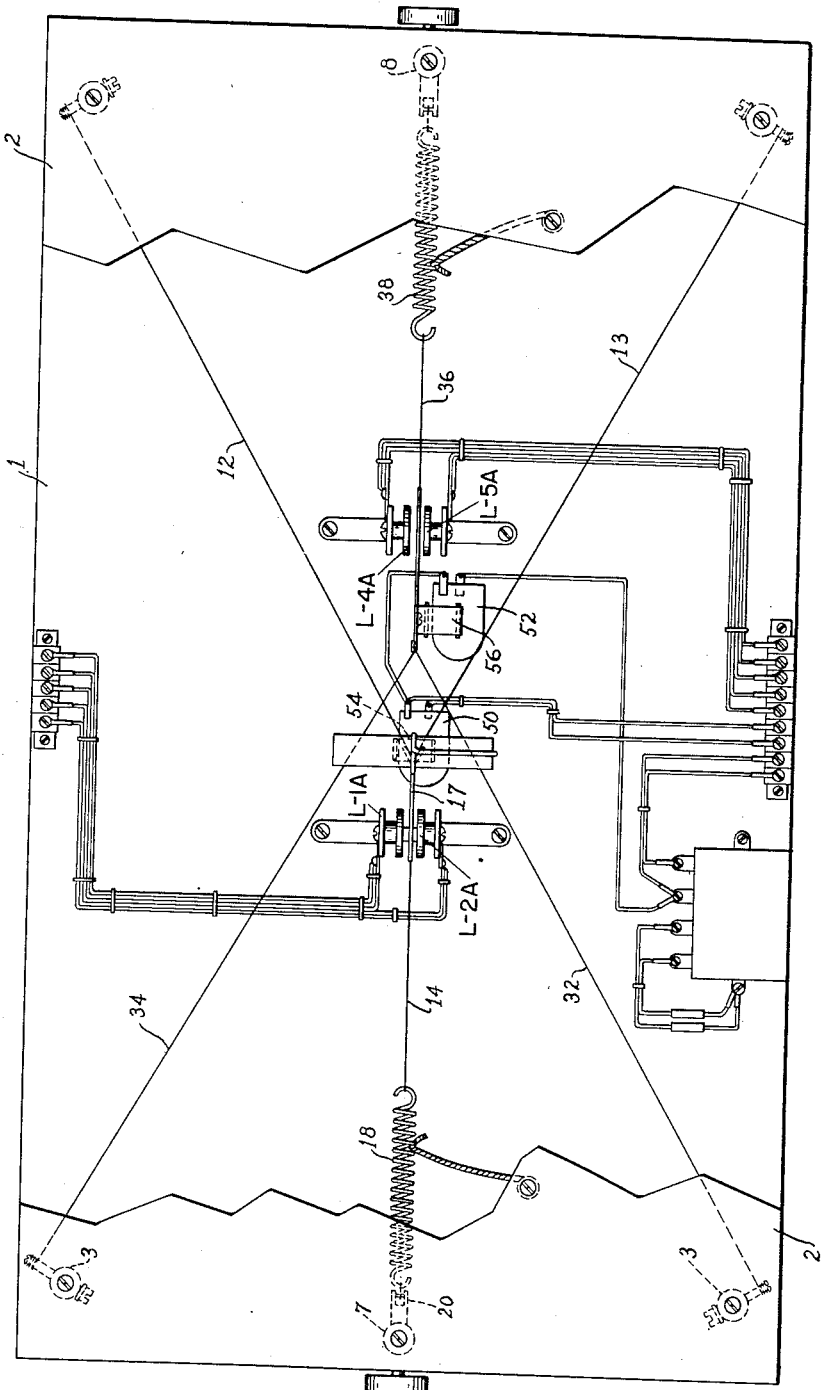
Fig. 2 is a plan view thereof, the top of the apparatus being broken away to expose certain parts underneath the same.

Reference will now be made to Figs. 1 and 2 of the drawings which illustrate suitable apparatus for determining the weight of an object in a time interval corresponding to that which would be available if the unit were operating at a speed of approximately 600 weighings per minute.

This apparatus includes a base plate 1 and a top plate 2 formed of any suitable material and connected by a pair of corner posts 3 at one end of these plates and a pair of corner posts 5 at the other end of these plates. Intermediate the posts 3 is a post 7, and intermediate posts 5 is a post 8.

Two resonant structures 10 and 30 are provided, which are supported in a manner which will now be described. The upper end of structure 10 projects upwardly through an aperture in plate 2 and is equipped with a spring clip 11 for holding individual objects such as for example cigarettes. Structure 10 is referred to as the sampling member. The structure 30 has a predetermined mass and is regarded as the standard member. The total mass of the sampling member is such that when loaded with a cigarette of ideal or required weight, its total mass is approximately equal to that of the standard member.

The structure 10 is supported resiliently by pairs of strings 12 and 13 which may be made of piano wire or other suitable flexible material. The piano wires 12 and 13 are anchored at their outer ends to the corner posts 5 and secured at their inner ends to the upper and lower ends of structure 10. The inner end of string 14, which is also formed of piano wire or other suitable material, is secured to the shield 17 which is formed of electrically conductive material and rigidly secured to structure 10 and forms a part thereof. A tension spring 18 secured to the outer end of piano wire 14 is anchored on a length of suitable flexible material such as piano wire 19 which passes over a guide 20 secured to the post 7. The wire 19 is secured to the inner end of a shaft 23 which is rotatably mounted in post 7 and provided with a knob 25 on its outer end. A plate 27 is suitably secured to post 7 by a screw 26. Plate 27 is provided at its upper end with an aperture through which projects a sleeve 28 which is secured to shaft 23, the knob 25 being secured to sleeve 28. A flange 29 on the inner end of sleeve 28 is engaged by the upper end of plate 27 and thereby held against a flattened portion 7a on post 7. Upon turning the knob 25 the vibration frequency of structure 10 may be regulated to correspond to the vibration frequency of the structure 30.

Structure 30 is resiliently supported by pairs of strings 32, 34 and a string 36 which may be formed from piano wire or other suitable flexible material. The piano wires 32 and 34 are secured to the upper and lower ends of structure 30 and anchored to corner posts 3. One end of piano wire 36 is connected to the shield 31 which forms an extension of structure 30. The shield 31 may be formed of any suitable electrically conductive material. The other end of wire 36 is connected to one end of a tension spring 38 which is connected at its other end to the lower end of piano wire 40 passing over a guide 42 secured to post 8. The upper end of piano wire 40 is secured to a shaft 44 carrying a knob 46. Since the construction of knob 46 and shaft 44 is similar to that of knob 25 and shaft 23, further description thereof is deemed unnecessary. It may be noted that by turning knob 46 the vibration frequency of structure 30 may be regulated.

The electromagnets 50 and 52 are secured to the base plate 1 and underlie armatures 54 and 56 secured to the structures 10 and 30 respectively. When the electromagnets 50 and 52 are energized by an electrical circuit which will be presently described, the armatures 54 and 56 are attracted and held thereon whereby the structures 10 and 30 are deflected from their neutral position. Upon deenergization of electromagnets 50 and 52 the structures are permitted to vibrate through one cycle after which the electromagnets are reenergized to lock the structures 10 and 30 in their deflected positions. The electrical circuit provides means for measuring individually, the time required for structures 10 and 30 to traverse a predetermined portion of one cycle of vibration and for comparing the individual time measurements for the purpose of weight determination.

Figure 3:
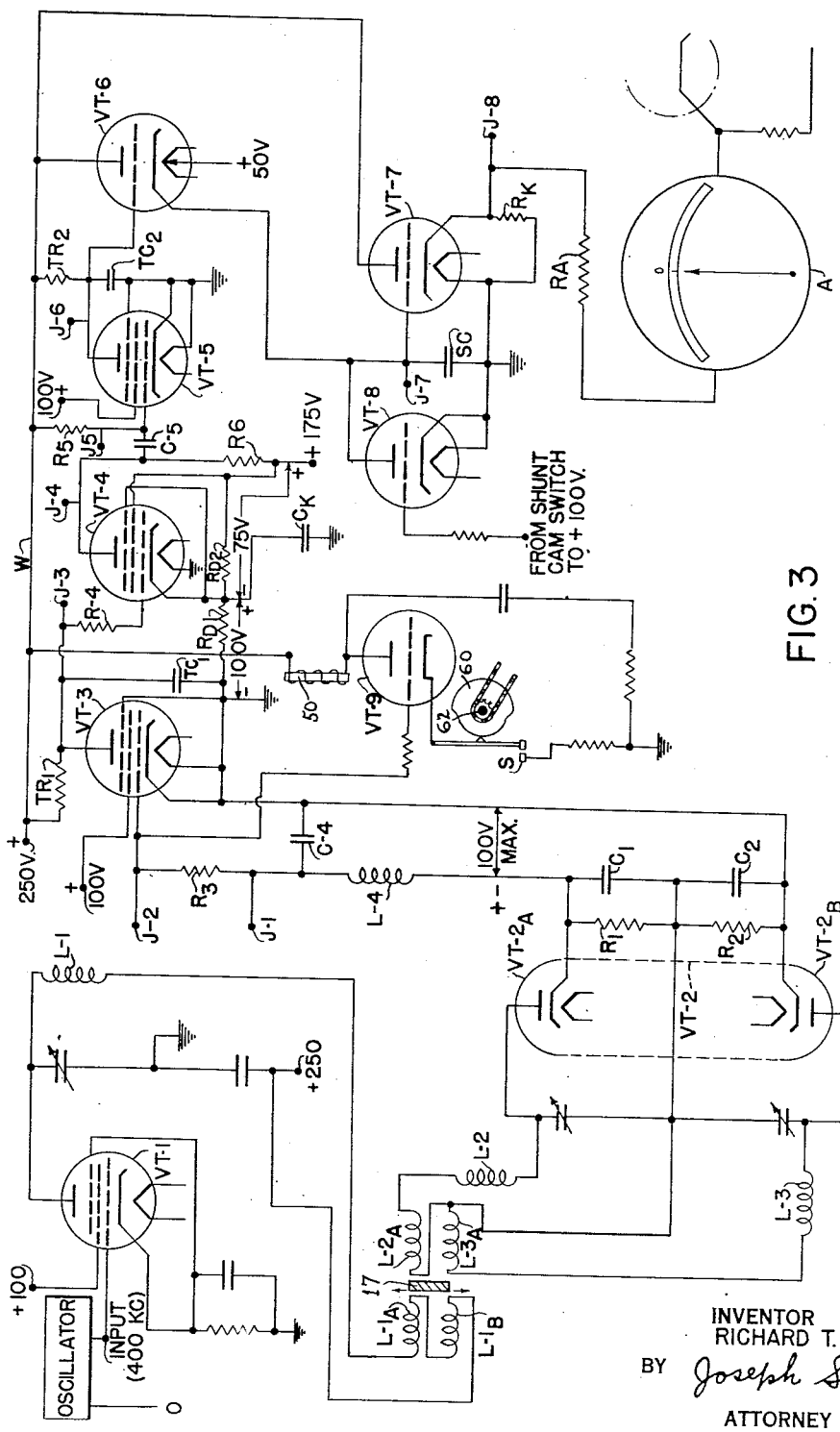
Fig. 3 is a wiring diagram of the electrical circuit employed for measuring the time required by the structure, supporting an object to be weighed, to complete a predetermined portion of one cycle of vibration.

Referring now to Fig. 3 of the drawings wherein a suitable circuit for this purpose is illustrated. A signal of constant frequency, such as 400 kilocycles, is generated by a vacuum tube oscillator O and fed simultaneously into the grids of two pick-up circuit amplifiers, each of which is associated with one of the structures 10 or 30. This is indicated by the legend "Input (400 kc.)" on the control grid of the amplifier tube VT-1 in Fig. 3. For simplicity only one circuit, which is connected to the coils L-1A, L-1B, L-2A and L-3A adjoining the shield 17 of structure 10, is shown. This circuit is also connected to the electromagnet 50. The other circuit is a duplicate thereof and is connected to the coils L-4A, L-4B, L-5A and L-6A adjoining the shield 31 of structure 30, and the electromagnet 52.

The 400 kc. signal is amplified by the tube VT-1 whose output is divided by a split circuit arrangement consisting of the coils L-1A, L-1B on one side of shield 17 and coils L-2A and L-3A on the other side of shield 17 and fed into a dual rectifier VT-2. Rectifier VT-2 is a double diode rectifier tube whose cathodes are connected to condensers C1 and C2. The output of this rectifier, whose peak voltage may have any suitable potential such as 100 volts indicated in Fig. 3, is delivered to a filter consisting of a coil L-4 and condenser C4.

The physical relationship between the coils L-1A, L-1B, L-2A and L-3A and shield 17 is such that when the structure 10 is in its mean or neutral position, the upper and lower edges of shield 17 are aligned with the axes of these coils and equal voltages are developed across coils L-2A and L-3A. When the shield 17 is displaced in a downward direction, a greater voltage is developed across coil L-2A while that across coil L-3A is reduced. If the shield is moved in an upward direction, the reverse is true.

Since the voltages developed across coils L-2A and L-3A are impressed on the anodes of sections VT-2A and VT-2B of the dual rectifier VT-2, the rectified output appears across their resistive cathode load. However, this load is also split, the output of VT-2A being developed across resistor R-1 while VT-2B develops its voltage across resistor R-2. It will be noted that these two load resistors develop potentials of opposite sign and, therefore, the resultant voltage appearing at the circuit's output is the algebraic sum of the two. Since VT-2A develops positive voltage and VT-2B develops negative voltage (as viewed from the output), the resultant, when the shield 17 is at mean position, equals zero. Positive output voltage appears when the shield is down and negative when it is up. If the structure 10 is set into motion and allowed to oscillate freely, the wave form of the output is very nearly sinusoidal. This may be observed by connecting an oscilloscope to the jack J-1. The shape of this output wave form is shown in Fig. 4 of the drawing.

A triode amplifier tube VT-9 has an anode which is connected to one lead of the electromagnet 50, the other lead of which is connected to a supply line W which is connected to a source of direct current of some suitable voltage such as +250 volts as indicated by the legend "+250 v." in Fig. 3. The grid of tube VT-9 is also connected to the output of the tube VT-2.

If the structure 10 is manually depressed, the proper potential will be applied to the grid of tube VT-9 to permit current to flow through its plate circuit when the switch S in the cathode circuit is closed. Therefore, the electromagnet 50 will be energized, while structure 10 is depressed, when the switch S in the cathode circuit of tube VT-9 is closed by a cam 60 mounted on a revolving shaft 62. The structure 10 will then be retained in its downwardly deflected position until the switch S is opened by cam 60.

The other circuit, which is connected to the electromagnet 52 and the coils L-4A, L-4B, L-5A and L-6A, which correspond to coils L-1A, L-1B, L-2A and L-3A, is provided with a triode amplifier tube (not shown) corresponding to tube VT-9. This tube also has an anode connected to the electromagnet 52 and a suitable source of direct current, and a grid connected to the output of a dual rectifier tube (not shown) corresponding to the tube VT-2. When the structure 30 is manually depressed to engage the armature 56 with electromagnet 52, the structure 30 will be retained in its downwardly deflected position upon closing of the cathode circuit of this tube by the same switch S.

*Time measuring circuit*

The time measuring circuit, which will now be described, includes a saw tooth wave generator tube VT-3 whose control grid receives single cycle sine wave input from the pickup circuit (Fig. 3) through a one megohm series resistor R3. The positive components of the input on the control grid are clipped by the voltage drop across resistor R3 and the output voltage of tube VT-3 assumes a form which would be a square wave of the type indicated by B in Fig. 5, if condenser TC-1 were not present in the plate circuit of tube VT-3. The time constant of the plate circuit (which includes the resistor TR-1 and condenser TC-1) is chosen to allow a rise of plate potential to approximately 100 volts during a predetermined portion of the time interval required for one cycle of vibration of structure 10. The resultant wave form displays a saw tooth characteristic indicated by the line B in Fig. 6. The shape of this wave form may be determined by connecting an oscilloscope to jack J-3.

The tube VT-4 constitutes a delayed voltage amplifier, short-pulse square wave generator and phase-inverter. The cathode of tube VT-4 is biased highly positive by a voltage divider RD-1—RD-2 connected to a supply of direct current of some suitable voltage such as 175 volts as indicated in Fig. 3. The control grid of tube VT-4 is connected to the anode of tube VT-3 through a grid resistor R-4. Therefore, tube VT-4 is operative only when its grid voltage approaches or exceeds the fixed cathode potential. This potential is adjusted to such a value that the grid prevents plate current flow until the saw tooth pattern (Fig. 6) has grown for approximately .025 second to a voltage indicated by the line C in Fig. 6. The plate potential of tube VT-3 then continues to increase until it reaches its peak voltage indicated by the line D in Fig. 6. The grid of tube VT-4 remains during this time at cathode potential due to the grid current flowing through resistor R-4, and the plate current in tube VT-4 flows during this interval of time which may be approximately .001 second as indicated in Fig. 6 of the drawings. In Figs. 7-11 the horizontal components correspond to .001 second, although this time varies from .00005 to .0007 second (approximately) in the present embodiment of the invention. The voltages of the grid corresponding to the voltages indicated by the lines C and D in Fig. 6 are indicated in Fig. 7 by the lines E-1 and E-2. The output of tube VT-4 assumes a square wave characteristic (Fig. 8) whose minimum and peak voltages are indicated by the dimension lines $E_K$ and $E_P$ in Fig. 7. In Fig. 7 $E_1$ indicates the point at which the control grid of tube VT-4 begins to exercise control of its plate current, and $E_2$ indicates the peak of the excitation signal. In Fig. 3 $R_6$ is a high resistance in series with the anode of VT-4. The wave form of the output of tube VT-4 may be determined by connecting an oscilloscope to the jack J-4 (Fig. 3) connected to the anode of VT-4.

The output of tube VT-4 is coupled to the control grid of tube VT-5 through the condenser C-5.

The tube VT-5 constitutes a short interval saw tooth generator. Timing resistor TR-2 connects the anode of tube VT-5 to the 250 volt supply line W, and timing condenser TC-2 is connected from the anode of tube VT-5 to ground. The control grid of tube VT-5 is normally biased for maximum plate current flow since it is connected through a resistor R-5 to the supply line W, resulting in minimum potential across condenser TC-2. It may be noted that the plates or anodes of the tubes VT-6 and VT-7 are also connected to the supply line W. When the control grid of tube VT-5 receives the square wave input from the tube VT-4 (Fig. 9), its output would appear as shown at Fig. 10 if condenser TC-2 were disconnected. Due to the presence of condenser TC-2 a saw tooth pattern is developed (Fig. 11).

The cathode circuit of the voltmeter rectifier tube VT-6 has no direct connection to ground with the result that any plate current flow results in a charge accumulating on condenser SC, connected between its cathode and ground. At the start of an operation cycle, condenser SC is presumed to have been discharged, as will be described later, after which it will immediately rise to a potential determined by the actual grid potential of tube VT-6 and the cut-off characteristic of its plate circuit. It will be noted that the grid of tube VT-6 is connected to the anode of tube VT-5. Therefore, the initial charge on condenser SC will be somewhat greater than the potential as measured from the anode of VT-5 to ground. When the grid of tube VT-6 is excited by the saw tooth pattern output of tube VT-5 illustrated in Fig. 11, the condenser SC is charged in a pattern, which is illustrated in Fig. 12. The leading edge of this pattern resembles that of Fig. 11. However, at the end of the pulse the grid of tube VT-6 is quickly returned to a much lower potential than its cathode, and the plate current of tube VT-6 is completely cut off while the peak charge remains on condenser SC. The line A in Fig. 12 shows the charging interval on condenser SC, while the line B illustrates the steady state of the charge thereon. The discharging of the condenser is illustrated by the line CD in Fig. 12.

Figure 14:
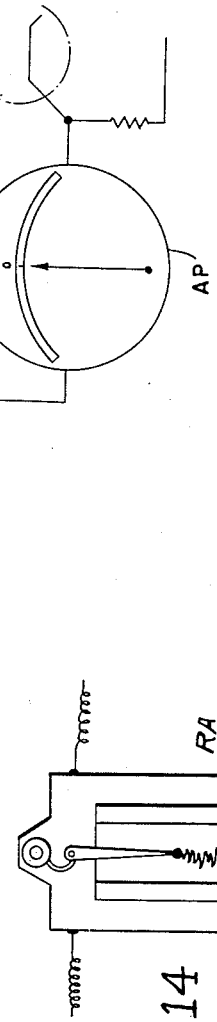
Fig. 14 shows a conventional recording ammeter.

The tube VT-7 serves as a cathode follower voltmeter for measurement of the charge on condenser SC. The grid of tube VT-7 is connected directly to condenser SC, and its cathode is connected through a resistor RK to ground. The voltage appearing across the cathode resistor RK is, therefore, always proportional to the charge on SC within the limits permitted by the anticipated conditions. A micro-ammeter A, which is provided with a series resistor RA, is connected to the cathode end of the resistor RK. Micro-ammeter A is utilized as a voltmeter and is returned to a suitable comparison voltage source. In the particular embodiment of the invention exemplified herein, the comparison source is a voltmeter tube similar to tube VT-7 and connected in an identical time measuring circuit, which measures the time required for the structure 30 to complete a predetermined portion of one vibration cycle while the structure 10 is completing a similar portion of one vibration cycle. However, if it were so desired, the structure 30 could be dispensed with and the actual comparison source could be a steady known voltage. If a continuous record is desired, a conventional recording ammeter such as RA shown in Fig. 14 could be employed instead of the micro-ammeter A.

The tube VT-8 forms the discharging circuit for the condenser SC. The grid of tube VT-8 is normally biased highly negative, causing its plate circuit to reflect infinite resistance to ground. When condenser SC is to be discharged, a positive bias is applied to the grid of tube VT-8 from a suitable source of a direct current connected thereto through a shunt cam switch (not shown) indicated by the legend "From shunt cam switch to +100 v." in the Fig. 3. This switch may be similar to the switch S and suitably closed by a cam similar to cam 60 at the end of the cycle of operation. The plate circuit then becomes conductive, discharging condenser SC. The slope of the discharge curve is shown between points "C" and "D" of Fig. 12. The rise of the curve after point "D" is the recharging of condenser SC to the cut-off point of tube VT-6.

The cam 60 is mounted on a shaft 62 which is suitably driven in timed relationship from a shaft 64. A sprocket 66 on shaft 64 is driven by a sprocket chain 68 from a suitable source of power (not shown). A crank disk 70 on shaft 64 is pivotally connected to one end of a connecting rod 72 whose other end is pivotally connected to a pusher 74. The pusher 74 reciprocates on the base 76 of a magazine 78 containing a supply of cigarettes to be weighed and serves to insert individual cigarettes between the top of the structure 10 and the clip 11 when the structure 10 is held in deflected position.

The cigarette thus inserted under clip 11 will be weighed when the switch S is opened to deenergize electromagnet 50 and permit vibration of structure 10. The structure 30 will be permitted to vibrate simultaneously with structure 10 upon deenergization of the electromagnet 52 in the same manner. Upon reading the micro-ammeter A a direct determination of the weight of the cigarette inserted under clip 11 may be made, if the ammeter is calibrated for the various weights of the cigarettes to be weighed.

The armatures 54 and 56 will reengage the electromagnets 50 and 52 at the end of the vibration cycle of the structures 10 and 30. The switch S is reclosed by the cam 60 during the charging period of condenser TC-1, while the grids of tubes VT-3 and VT-9 are highly negative and their anode currents cut off. Therefore, as soon as these grids turn positive at the end of the timing period, magnets 50 and 52 are reenergized and will reengage and lock armatures 54 and 56 at the end of the vibration cycle.

In the next cycle of operation the delivery of the next cigarette underneath clip 11 by the pusher 74 will eject the preceding cigarette from underneath the clip 11 and permit the same to roll down upon the plate 2, as illustrated in Fig. 1. It should be noted here that that part of the apparatus situated below frame plate 2 is shown on a relatively much larger scale than the part above plate 2.

Following is a description of the principal parts of the circuit shown in Fig. 3 and their functions:

| Reference Character | | Type |
|---|---|---|
| VT-1 | 400 kc. amplifier and buffer | 6K7G. |
| VT-2 | Dual rectifier | 6H6. |
| VT-3 | Saw tooth generator | 6SJ7. |
| VT-4 | Delayed voltage amplifier, square wave generator, and phase inverter. | 6SJ7. |
| VT-5 | Short pulse saw tooth generator | 6SJ7. |
| VT-6 | Grid controlled, peak voltmeter rectifier tube. | ½ 6SN7. |
| VT-7 | Cathode follower VTVM | ½ 6SN7. |
| VT-8 | Condenser shunt tube | ½ 6SN7. |
| L-1 | Plate inductance of tube VT-1 (approximately 1 mh.). | |
| L-1A | Plate coupling coil (air core) | |
| L-1B | ----do---- | |
| L-2 | Diode inductance for Positive output | |
| L-2A | Diode supply pick-up coil | |
| L-3 | Diode inductance for Negative output of tube VT-2. | |
| L-3A | Diode supply pick-up coil | |
| L-4 | R. F. choke, filters R. F. components from time measuring circuit. | |
| R-1 | Diode load for Positive output of tube VT-2 | |
| R-2 | Diode load for Negative output of tube VT-2. | |
| RD₁-RD₂ | Voltage divider. Determines tripping point of VT-4. | |
| TR₁ | Timing resistor. In combination with condenser TC₁ determines slope of saw tooth curve developed by tube VT-3. | |
| CK | Cathode by-pass condenser for tube VT-4. | |
| SC | Peak charge storage condenser. Capacity used in present embodiment of invention may be ½ mfd. to allow storage for comparatively long intervals. | |
| TR₂ | Timing resistor. In combination with condenser TC₂ determines slope of saw tooth curve developed by tube VT-5. | |

Figure 13:
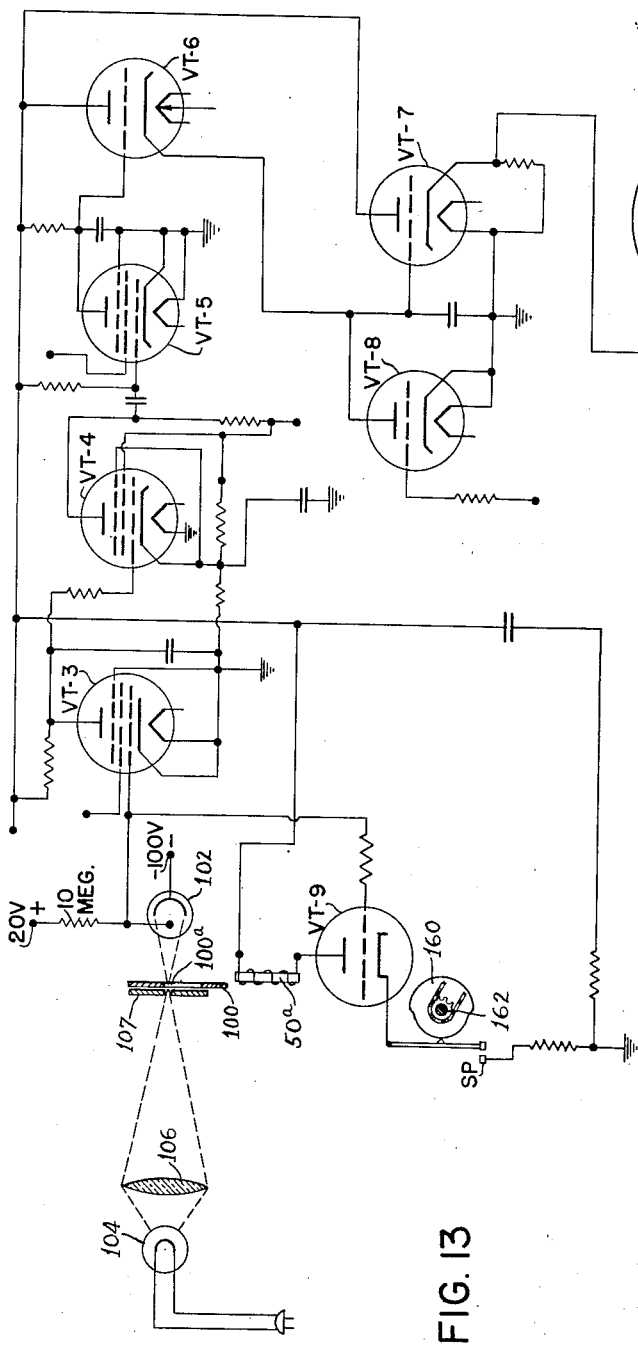
Fig. 13 shows an alternative method for measuring the time required by the vibrating structure to complete a predetermined portion of one cycle of vibration.

In Fig. 13 is illustrated a modified form of the invention for measuring the time differences required for a predetermined portion of one cycle of vibration of the structures 10 and 30, when a cigarette is supported on structure 10, and interpreting the variations in terms of the weight of this cigarette. The circuit shown in Fig. 13 is employed in conjunction with a photoelectric cell, a suitable light source, an optical system and a light shutter. The light system includes an incandescent lamp 104 and a lens 106 which directs a beam of light from lamp 104 through a narrow slit in diaphragm 107 and through the opening 100a in a shutter 100 on to the photoelectric cell 102.

The light shutter 100 is mounted on the structure 10 in place of the shield 17. Shutter 100 is provided with an opening 100a through which the light beam is projected on to the photocell 102 when structure 10 is above the neutral position shown in Fig. 13. The opening 100a is so arranged that the photocell 102 will be illuminated during a selected portion of one cycle of vibration of structure 10.

The breadth of opening 100a may be such that its upper edge will expose the light beam and illuminate cell 102 when the structure moves up to the center of its vibration cycle. In this case the photocell will be illuminated until the upper edge of the opening 100a returns to the center of the vibration cycle. This time interval is used as the basis of measurement of the weight of the cigarette.

The circuit shown in Fig. 13 is similar to that shown in Fig. 3 except that the photoelectric cell 102 and a 10 megohm resistor are substituted for the oscillator O of the circuit shown in Fig. 3, the coils L-1, L-1A, L-1B, L-2, L-2A, L-3 and L-3A, the shield 17, the amplifier tube VT-1, rectifier VT-2 and its associated output circuit consisting of R-1, R-2, C-1, C-2, L-4, C-4 and R-3. The circuit shown in Fig. 13 is connected in a manner hereinafter described to a duplicate circuit (not shown) including a photocell similar to photocell 102 and controlled by a light system and shutter (not shown) similar to that shown in Fig. 13. The shutter (not shown) may be mounted on the structure 30 in place of or upon the extension 31 and similarly expose the light beam to illuminate the photocell (not shown).

The anode of photocell 102 is connected to the control grid of tube VT-3. The anode of photocell 102 is connected through a 10 megohm resistor to a suitable source of direct current having a suitable voltage such as +20 volts as indicated by the legend in Fig. 13. The grid of tube VT-9 is also connected to this source of direct current through the same resistor. The cathode of photocell 102 is suitably biased as indicated by the legend "—100 v." in Fig. 13.

While the switch SP in the plate circuit of tube VT-9 is closed by the cam 160, which is mounted on revolving shaft 162, the electromagnet 50a will be energized and will retain the structure 10 (Figs. 1 and 2) in its downwardly deflected position keeping the light beam cut off. When the cam 160 permits the switch SP to open, the electromagnet 50a will be deenergized and the structure 10 will vibrate through one cycle of vibration. The electromagnet 50a is normally energized to attract and hold the armature 54 on structure 10 and thereby maintain the latter in its downwardly deflected position.

When the photocell is illuminated during the vibration of shutter 100 with structure 10, the anode current of tube VT-3 is immediately cut off, and the tubes VT-3, VT-4, VT-5, VT-6, VT-7 and VT-8 operate like the tubes VT-3, VT-4, VT-5, VT-6, VT-7 and VT-8 shown in Fig. 3.

The resulting reading on the ammeter AP indicates the weight of the cigarette supported on structure 10. Ammeter AP is connected to the circuit described in connection with Fig. 13 and also to the other circuit (not shown) which is a duplicate of the circuit just described. If desired, a conventional recording ammeter RA shown in Fig. 14 could be employed in place of the ammeter AP to produce a continuous recording.

In the description of the operation of the vibrating structures 10 (and 30) and the timing circuits of Fig. 3 and Fig. 13, it may be noted that the portion of the cycle of vibration which is timed is from the instant the structure 10 passes through its neutral position in an upward direction, until it passes the same point on its return movement. The duration of this period depends only on the resilience of the supporting wires 12, 13 and 14 and spring 18 and the weight or mass of structure 10, including vane 17, armature 54 and the cigarette supporting structure. It does not depend on the amplitude of vibration as long as this amplitude is limited to a range within which the force tending to restore the structure to neutral is substantially proportional to the displacement from neutral. I could have chosen a position either below or above the neutral position as a reference point for the beginning and end of the timing period, but in such a case the length of the period would no longer be independent of the amplitude. I, therefore, prefer to use the neutral position as a reference point.

If the final charge on condenser SC and the resulting voltage across resistor RK is compared with a fixed voltage, extraneous vibrations imposed on the entire frame will have an effect on the reading, because the timed period will be lengthened or shortened depending on the phase relation of the vibration of structure 10 and the extraneous vibration. If, however, this charge is compared with one obtained in a similar manner from another vibrating structure, which is released simultaneously with the first and subject to the same external vibrations, they will both be affected to the same degree, and the reading will be substantially independent of extraneous vibration. Therefore, I prefer to use the twin structures 10 and 30, which are released simultaneously by cam-operated switch S.

The invention above described may be varied in construction within the scope of the claims, for the particular device selected to illustrate the invention is but one of many possible embodiments of the same. The invention, therefore, is not to be restricted to the precise details of the structure shown and described.

What is claimed is:

1. In a weighing apparatus, the combination with a vibratory device adapted to vibrate when deflected from a neutral position, a support carried by said device and adapted to carry material to be weighed whereby variations in the mass of the material carried on said support will vary the vibration frequency of said device, mechanism for deflecting said device from a neutral position each time material has been placed on said support and releasing the same to permit a single cycle of vibration thereof, and an instrument for determining the time interval between the moment said device crosses said neutral position each time material is placed on said support and subsequently returns to said neutral position.

2. In a weighing apparatus, the combination with a structure adapted to vibrate when deflected from a neutral position, a support on said structure adapted to carry material to be weighed whereby variations in the mass of the material supported thereon will vary the period of vibration thereof, means for deflecting said structure from its neutral position and releasing the same to permit vibration thereof each time material to be weighed is placed on said support, a device responsive to variations in the time required by said structure to complete a predetermined portion of a single cycle of vibration thereof, said variations being created by variations in the weight of the material being weighed, and an indicator controlled by said device for indicating the weight of the material carried by said structure, said device including an electrical circuit which is responsive to the degree of deflection of said support from its neutral position when vibrated, and a condenser connected to said circuit to receive a variable charge conforming to the time required for said structure to traverse said predetermined portion of one cycle of vibration, said indicator including a voltmeter connected to said condenser and a source of predetermined voltage connected to said voltmeter, said condenser and said source of predetermined voltage being so connected to said voltmeter that differences in output thereof will be indicated on the voltmeter.

3. In a weighing apparatus, the combination with a structure adapted to vibrate when deflected from a neutral position, said structure being adapted to support material to be weighed, and means for maintaining said structure in a deflected position and then releasing said structure to permit vibration thereof through a single cycle of vibration, said means including an armature connected to said structure, an electromagnet adapted when energized to attract said armature and maintain said structure in a deflected position, an electrical circuit normally energizing said electromagnet, and a control for breaking said circuit and deenergizing said electromagnet to permit said structure to vibrate through one cycle of vibration, said control operating to reenergize said circuit when said armature reengages said electromagnet at the end of one cycle of vibration of said structure whereby said structure will again be maintained in a deflected position.

4. In a weighing apparatus, the combination with a frame, of a plurality of taut primary strings secured to one section of said frame, a vertical member adapted to support an object to be weighed, said primary strings being secured to one side of said member, a secondary string secured to the other side of said member, and a spring connected to said secondary string, and a section of said frame opposite to the section to which the primary strings are secured whereby said member is resiliently supported from said frame, and a device adapted to maintain said member in a deflected position and release said member to permit vibration thereof.

5. In a weighing apparatus for rapidly weighing cigarettes, the combination with a vibratory device adapted to vibrate when deflected from a neutral position, a support carried by said device and adapted to support individual cigarettes to be weighed whereby variations in the weight of the cigarettes placed on said support will vary the vibration frequency of said device, mechanism for deflecting said device from a neutral position and releasing the same to permit a single cycle of vibration thereof for each cigarette placed on said support and means for measuring the time required to complete a portion of a single vibration of said device when supporting the weight of the cigarette placed on said support.

6. In a weighing apparatus, the combination with a vibratory device adapted to vibrate when deflected from a neutral position, a support carried by said device and adapted to carry material to be weighed whereby variations in the mass of the material carried on said support will vary the vibration frequency of said device, mechanism for deflecting said device from a neutral position and releasing the same to permit a single cycle of vibration thereof each time material to be weighed is placed on said support, and an instrument for determining the time interval between the moment said device crosses said neutral position and returns to said neutral position in the same cycle of vibration.

7. In a weighing apparatus, the combination with a structure adapted to vibrate when deflected from a neutral position, a support on said structure adapted to carry material to be weighed whereby variations in the mass of the material supported thereon will vary the period of vibration thereof, means for deflecting said structure from its neutral position and releasing the same to permit a single cycle of vibration thereof each time material to be weighed is placed on said support, a device responsive to variations in the time required by said structure to complete a predetermined portion of a single cycle of vibration thereof, said variations being created by variations in the weight of the material to be weighed, and an indicator controlled by said device for indicating the weight of the material carried by said structure.

8. In a weighing apparatus, the combination with a structure adapted to vibrate when deflected from a neutral position, a support on said structure adapted to carry material to be weighed whereby variations in the mass of the material supported thereon will vary the period of vibration thereof, means for deflecting said structure from its neutral position and releasing the same to permit vibration thereof, a device responsive to variations in the time required by said structure to complete a predetermined portion of a single cycle of vibration thereof, said variations being created by variations in the weight of the material being weighed, said device including an electrical circuit which is responsive to the degree of deflection of said support from its neutral position, a condenser connected to said circuit to receive a variable charge conforming to the time required for said structure to traverse said predetermined portion of one cycle of vibration, and an indicator controlled by said device for indicating the weight of the material carried by said structure.

9. In a weighing apparatus, the combination with a structure adapted to vibrate when deflected from a neutral position, a support on said structure adapted to carry material to be weighed whereby variations in the mass of the material supported thereon will vary the period of vibration thereof, means for deflecting said structure from its neutral position and releasing the same to permit vibration thereof, a device responsive to variations in the time required by said structure to complete a predetermined portion of a single cycle of vibration thereof, said variations being created by variations in the weight of the material to be weighed, said device including an electrical circuit, a pair of primary coils connected to said electrical circuit, a pair of secondary coils, an electrically conductive shield supported on said structure and extending between said primary and secondary pairs of coils, and an indicator controlled by said device for indicating the weight of the material carried by said structure.

10. In a weighing apparatus, the combination with a vibratory device adapted to vibrate when deflected from a neutral position, a support carried by said device and adapted to carry material to be weighed whereby variations in the mass of the material carried on said support will vary the vibration frequency of said device, mechanism for deflecting said device from a neutral position and releasing the same to permit vibration thereof, and means for determining the time it takes to make two successive passes over said neutral position, said means including an electric circuit responsive to the degree of deflection of said device from its neutral position and a condenser connected to said electric circuit, said electric circuit operating to impose a single sawtooth wave of electrical current on said condenser.

11. In a weighing apparatus, the combination with a vibratory device adapted to vibrate when deflected from a neutral position, a support carried by said device and adapted to carry material to be weighed whereby variations in the mass of the material carried on said support will vary the vibration frequency of said device, mechanism for deflecting said device from a neutral position and releasing the same to permit vibration thereof, and means for determining the time it takes said device to make two successive passes over said neutral position, said means including a source of light, a photoelectric cell arranged to receive a beam of light from said light source, a shutter connected to said device and adapted to obstruct said light beam when said structure is deflected from its neutral position, and an electric circuit connected to said photoelectric cell and responsive to variations in the illumination of said photoelectric cell produced when said device is released by said mechanism.

12. In a weighing apparatus, the combination with a vibratory device adapted to vibrate when deflected from a neutral position, a support carried by said device and adapted to carry material to be weighed whereby variations in the mass of the material carried on said support will vary the vibration frequency of said device, mechanism for deflecting said device from a neutral position and releasing the same to permit vibration thereof, and means for determining the time it takes said device to make two successive passes over said neutral position, said deflecting mechanism including an armature on said device, an electromagnet adapted when energized to attract said armature and maintain said device in a deflected position, an electrical circuit normally energizing said electromagnet, and a control for breaking said circuit and deenergizing said electromagnet to permit said device to vibrate through one cycle of vibration, said control operating to reenergize said circuit when said armature reaches said electromagnet at the end of one cycle of vibration of said structure.

13. In a weighing apparatus, the combination with a primary structure adapted to be vibrated when deflected from a neutral position, of a secondary structure adapted to be vibrated when deflected from a neutral position whenever said primary structure is vibrated, a support on said secondary structure adapted to carry material to be weighed and to vibrate therewith, said secondary structure having approximately the same vibration frequency as said primary structure when material of a predetermined mass is carried on said support whereby variations in the mass of the material to be weighed on said secondary structure will change the vibration frequency of said secondary structure relatively to the vibration frequency of said primary structure, means for deflecting both of said primary and secondary structures from their neutral positions and releasing them to permit a single vibration thereof, and instrumentalities for determining the time it takes each of said structures to make two successive passes over said neutral position and automatically comparing the difference in time between the two structures to determine the weight of the material supported on said secondary structure.

14. In a weighing apparatus, the combination with a primary structure adapted to be vibrated when deflected from a neutral position, of a secondary structure adapted to be vibrated when deflected from a neutral position whenever said primary structure is vibrated, a support on said secondary structure adapted to carry material to be weighed and to vibrate with the material, said secondary structure having approximately the same vibration frequency as said primary structure when material of a predetermined mass is carried on said support whereby variations in the mass of the material to be weighed on said secondary structure will change the vibration frequency of said secondary structure relatively to the vibration frequency of said primary structure, means for deflecting both of said primary and secondary structures from their neutral positions and releasing them to permit a single vibration thereof, a control for simultaneously releasing said primary and secondary structures at their deflected positions to permit a single simultaneous vibration thereof for each article that is weighed and means for determining the time it takes each of said structures to make two successive passes over said neutral position and automatically comparing the difference in time between the two structures to determine the weight of the material supported on said secondary structure.

15. In a weighing apparatus, the combination with a primary structure adapted to be vibrated when deflected from a neutral position, of a secondary structure adapted to be vibrated when deflected from a neutral position whenever said primary structure is vibrated, a support on said secondary structure adapted to carry material to be weighed and to vibrate therewith, said secondary structure having approximately the same vibration frequency as said primary structure when material of a predetermined mass is carried on said support whereby variations in the mass of the material to be weighed on said secondary structure will change the vibration frequency of said secondary structure relatively to the vibration frequency of said primary structure, means for deflecting both of said primary and secondary structures from their neutral positions and releasing them to permit a single vibration thereof for each amount of material placed on said support, and instrumentalities for measuring the time required for each of said primary and secondary structures to complete a certain portion of a single cycle of said vibration whereby the weight of the material carried on said support on the secondary structure can be compared with the known weight of the primary structure, said instrumentalities including a pair of electrical circuits, one of said circuits being responsive to the degree of deflection of said primary structure from its neutral position, and the other of said circuits being responsive to the degree of deflection of said secondary structure from its neutral position, and a voltmeter so connected to both of said circuits as to respond to the difference between their outputs.

16. In a weighing apparatus, the combination with a primary and a secondary structure adapted to vibrate when deflected from a neutral position, said secondary structure being adapted to support material to be weighed and vibrate with the material, means for maintaining said structures in a deflected position and then releasing said primary structure and said secondary structure and the material supported thereby to permit vibration of said structures and material through a single cycle of vibration, and means for measuring the time it takes said secondary structure to complete one portion of a single cycle of vibration and automatically comparing it to the time it takes the primary structure to complete one portion of a single cycle of vibration to determine the weight of the material supported on said secondary structure.

17. In a weighing apparatus, the combination with a primary and a secondary structure adapted to vibrate when deflected from a neutral position, said secondary structure being adapted to support material to be weighed and to vibrate therewith, and means for maintaining said primary and secondary structures in a deflected position and then releasing said structures to permit vibration thereof through a single cycle of vibration, mechanism for delivering an object to be weighed to said secondary structure while it is maintained in a deflected position by said means and then removing said object from said secondary structure after the latter has vibrated through one cycle of vibration and a device for measuring the time it takes said primary and secondary structures to complete a portion of each cycle of vibration to determine the weight of the object supported on said structure through the difference in vibration time between both structures.

18. In a weighing apparatus, the combination with a primary structure adapted to be vibrated when deflected from a neutral position, of a secondary structure adapted to be vibrated when deflected from a neutral position whenever said primary structure is vibrated, a support on said secondary structure adapted to carry material to be weighed and to vibrate therewith, said secondary structure having approximately the same vibration frequency as said primary structure when material of a predetermined mass is carried on said support, means for deflecting both of said primary and secondary structures from their neutral positions and releasing them to permit a single vibration thereof, and instrumentalities for measuring the time required for said primary and secondary structures to pass back and forth over said neutral positions whereby the weight of the material carried on said support on the secondary structure can be compared with the known weight of the primary structure, and mechanism for delivering an object to be weighed to said secondary structure while the latter is maintained in a deflected position by said means and then removing said object from said secondary structure after the latter has returned to its deflected position.

19. In a weighing apparatus, the combination with a primary structure adapted to be vibrated when deflected from a neutral position, of a secondary structure adapted to be vibrated when deflected from a neutral position whenever said primary structure is vibrated, a support on said secondary structure adapted to carry material to be weighed and to vibrate therewith, said secondary structure having approximately the same vibration frequency as said primary structure when material of a predetermined mass is carried on said support whereby variations in the mass of the material to be weighed on said secondary structure will change the vibration frequency of said secondary structure relatively to the vibration frequency of said primary structure, means for deflecting both of said primary and secondary structures from their neutral positions and releasing them to permit one cycle of vibration thereof for each quantity of material weighed, and instrumentalities for measuring the time required for each of said primary and secondary structures to complete a certain portion of a single cycle of vibration whereby the weight of the material carried on and vibrated with said support on the secondary structure can be compared with the known weight of the primary structure by measuring the time difference for each structure to complete the certain portion of a single cycle of vibration, and mechanism for regulating the vibration frequency of each of said primary and secondary structures.

References Cited in the file of this patent

UNITED STATES PATENTS

| Number | Name | Date |
|---|---|---|
| 1,995,305 | Hayes | Mar. 26, 1935 |
| 2,077,390 | Blau | Apr. 20, 1937 |
| 2,102,317 | Gwinn | Dec. 14, 1937 |
| 2,265,011 | Siegel | Dec. 2, 1941 |
| 2,305,783 | Heymann et al. | Dec. 22, 1942 |
| 2,306,137 | Pabst et al. | Dec. 22, 1942 |

FOREIGN PATENTS

| Number | Country | Date |
|---|---|---|
| 105,798 | Australia | Nov. 10, 1938 |